(12) United States Patent
Chagam Reddy (10) Patent No.: US 10,394,634 B2
(45) Date of Patent: Aug. 27, 2019

(54) DRIVE-BASED STORAGE SCRUBBING

(71) Applicant: Intel Corporation, Santa Clara, CA (US)

(72) Inventor: Anjaneya R. Chagam Reddy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 15/640,229

(22) Filed: Jun. 30, 2017

(65) Prior Publication Data

US 2019/0004888 A1    Jan. 3, 2019

(51) Int. Cl.
*G06F 7/02* (2006.01)
*H03M 13/00* (2006.01)
*G06F 11/07* (2006.01)

(52) U.S. Cl.
CPC ...... *G06F 11/0751* (2013.01); *G06F 11/0709* (2013.01); *G06F 11/0727* (2013.01)

(58) Field of Classification Search
CPC .. G06F 11/1076; G06F 3/061; G06F 11/1092; G06F 2211/1028; G06F 11/0751; G06F 11/0709; G06F 11/0727; G06F 11/106; H04L 67/1097; H04L 9/3247; H04L 2209/30; H03M 7/30
See application file for complete search history.

(56) References Cited

U.S. PATENT DOCUMENTS

| | | | |
|---|---|---|---|
| 7,246,269 B1* | 7/2007 | Hamilton | G06F 11/106 714/42 |
| 7,549,089 B1* | 6/2009 | Kimmel | G06F 11/1076 714/42 |
| 9,098,376 B2* | 8/2015 | Resch | G06F 8/65 |
| 2003/0033308 A1* | 2/2003 | Patel | G06F 11/1076 |
| 2007/0204028 A1* | 8/2007 | Lee | G06F 3/0613 709/223 |

(Continued)

OTHER PUBLICATIONS

U.S. Appl. No. 15/639,781, entitled "Scrubbing Disaggregated Storage," filed Jun. 30, 2017.

(Continued)

*Primary Examiner* — Guerrier Merant
(74) *Attorney, Agent, or Firm* — Schwabe, Williamson & Wyatt, P.C.

(57) ABSTRACT

Apparatuses, systems and methods are disclosed herein that generally relate to distributed storage, such as for big data, distributed databases, large datasets, artificial intelligence, genomics, or any other data processing environment using that host large data sets or utilize big data hosts using local storage or storage remotely located over a network. More particularly since large scale data requires many storage devices, scrubbing storage for reliability and accuracy requires communication bandwidth and processor resources. Discussed are various ways to use known storage structure, such as LBA, to offload scrubbing overhead to storage by having storage engage in autonomous self-validation. Storage may scrub itself and identify stored data failing data integrity validation, or identify unreadable storage locations, and report errors to a distributed storage system that may reverse-lookup the affected storage location to identify, for example, a data block at that location needing correction.

20 Claims, 6 Drawing Sheets

(56) References Cited

U.S. PATENT DOCUMENTS

| | | | |
|---|---|---|---|
| 2008/0270843 A1* | 10/2008 | Winarski | G06F 3/0607 |
| | | | 714/42 |
| 2009/0077003 A1 | 3/2009 | Rai et al. | |
| 2011/0029836 A1* | 2/2011 | Dhuse | G06F 11/1076 |
| | | | 714/752 |
| 2013/0282668 A1 | 10/2013 | Hsieh | |
| 2014/0280681 A1* | 9/2014 | Resch | G06F 11/1076 |
| | | | 709/213 |
| 2014/0281702 A1 | 9/2014 | Venkata | |
| 2016/0266801 A1 | 9/2016 | Marcelin et al. | |
| 2017/0133106 A1* | 5/2017 | Viswanathan Pillai | |
| | | | G11C 29/42 |
| 2017/0177249 A1* | 6/2017 | Kurilov | G06F 11/0751 |
| 2018/0032462 A1 | 2/2018 | Olarig et al. | |

OTHER PUBLICATIONS

Welcome to Apache.™ Hadoop®! (n.d.). Retrieved Oct. 18, 2017, from URL <<http://hadoop.apache.org/>>.

Homepage. (n.d.). Retrieved Oct. 18, 2017, from URL<<http://ceph.com/>>.

End-to-End Data Protection Justification. T10/03-224r0. Retrieved Oct. 18, 2017 from URL <<http://www.t10.org/ftp/t10/document.03/03-224r0.pdf>>.

INCITS/B10—Identification Cards and Related Devices . Retrieved Oct. 18, 2017 from URL <<http://www.incits.org/committees/t10>>.

Non-Final Office Action dated Apr. 16, 2019 for U.S. Appl. No. 15/639,781, 26 pages.

\* cited by examiner

DRIVE-BASED STORAGE SCRUBBING

TECHNICAL FIELD

The present disclosure relates to distributed storage, such as for big data, distributed databases, large datasets, artificial intelligence, genomics, etc. that use storage remotely located over a network, and more particularly, to shifting drive scrubbing from host-based to drive-based validation to reduce the amount of data a host accesses over drive buses such as PCIe or over the network.

BACKGROUND AND DESCRIPTION OF RELATED ART

With the incredible number of devices being interconnected all of these interactions generate enormous amounts of data that needs to be stored—somewhere. And this does not include the enormous amount of data created by device users, shoppers, consumers, producers, etc. all of which also needs to be stored, again—somewhere. But beyond simple storage, there is also demand for security, redundancy, fast access, and reliability to stored data. There are many options for implementing a "back end" and two well-known free and hence popular implementations are based on Ceph and Hadoop® technology. These two platforms will be used as exemplary environments in which various aspects of inventive concepts disclosed in the detailed description may be practiced. It is assumed the reader is familiar with implementing both Ceph and Hadoop®, see for example Internet Uniform Resource Locators (URLs) ceph.com and Hadoop®.apache.org, and that the reader understands how data is stored, distributed, and validated for correctness.

As will be appreciated, because "Big Data" typically uses many systems and storage environments distributed across various networks, there may be a lot of overhead in scrubbing (e.g. validating) data that is being stored. This overhead can be particularly substantial, for example, when disaggregated storage such as Nonvolatile Memory Express over Fabrics (NVMe-oF) storage targets/disks are used.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

As the world moves, inexorably, into a system of billions of interconnected devices, it is becoming increasingly important to implement robust data storage systems. Conventional storage environments have provided data storage servers having various kinds of local storage managed by the server and utilized for storing data from many different clients. Over time the mode of local storage has evolved to disaggregated storage utilizing storage technology remote to the devices/machines/servers/etc. managing the storage. Since a fundamental requirement of robust storage is maintaining data integrity, it is typically necessary to (hopefully regularly) scrub the storage to identify errors. Storage errors, it will be understood by one skilled in the art, may come from a variety of problems. For example, what seems like a simple write operation actually requires many levels of traversal between the machine/software initiating the write to actually getting the data written, e.g., there are operating software involved in the write that may fail, network hardware that may fail, the remote server software may fail, its storage controller may fail, as well as the storage media itself may introduce errors during writing as well as after the data being written (colloquially called "bit rot"). To alleviate some of the data error risks, storage systems introduce data integrity models that define protocols to ensure data integrity preservation for an I/O request as it transfers from the machine/software requesting a write operation (or read) operation to the physical storage on physical storage. Various embodiments of disk-based scrubbing disclosed herein can take advantage of data integrity techniques that have been developed over the years.

Data integrity is generally implemented by associating additional data (metadata) with each input/output (IO) request, e.g., a write request. The data integrity metadata (DIM) includes information that may be used to verify the data being written is correct at any point from making the storage request to it being written to storage. It will be appreciated that DIM may represent multiple levels of integrity envelopes wrapping the data as it travels, and such use of wrapping/unwrapping and validating data as it travels is understood by the reader. It is assumed the reader is familiar with storage and data integrity standards relating thereto, e.g., the standards presented at t10.org. For example, T10 describes the Data Integrity Field (DIF), an approach to protecting stored data from corruption. DIF was proposed by a T10 subcommittee of the International Committee for Information Technology Standards. See Internet URL www.incits.org/committees/t10. T10 is part of the InterNational Committee on Information Technology Standards (INCITS) accredited by the American National Standards Institute (ANSI). See, e.g., URL www.t10.org/ftp/t10/document.03/03-224r0.pdf.

One feature of DIF is extending a disk sector from a traditional 512 bytes, to 520 bytes, by adding eight additional data integrity bytes. It will be appreciated the 512 byte sector size is arbitrary and a disk may be formatted with any sector size and have associated protection bytes of arbitrary length. The DIF concept is incorporated into the T10-PI standard, an extension of the T10 SCSI Block Commands specification, which uses "Protection Information" (PI) data (including validating data such as a checksum) that is transmitted from the host bus adapter (HBA) and application to a storage device. Because the PI travels with the data, it is possible to provide end-to-end data integrity. In the illustrated embodiments, the PI is written to the storage along with the data (e.g., host data blocks) to allow validating read data. The following FIG. 1 and FIG. 2 descriptions illustrate two well-known storage environments, Ceph and Hadoop®. They are briefly described to give an underlying datacenter context for the disclosure herein on ways to improve data integrity in these and other storage environments currently in use or that may be developed later to which the disclosed principles and techniques may be applied.

Figure 1:
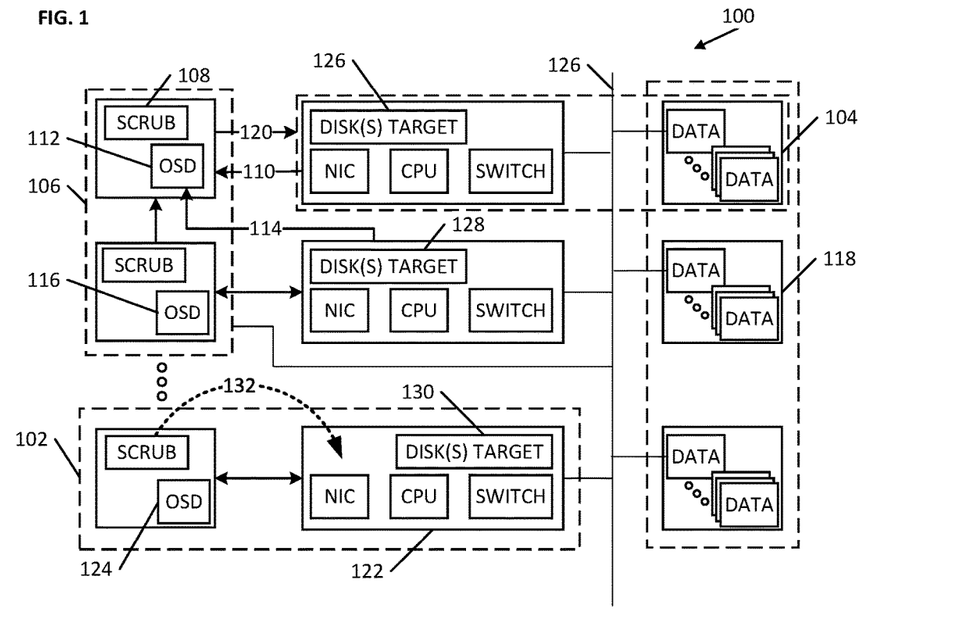
FIG. 1 illustrates an exemplary data storage environment modeled after a typical Ceph installation.

FIG. 1 illustrates an exemplary data storage environment 100 based in part on a typical Ceph installation. Briefly, Ceph is an open source distributed storage software platform designed to operate on standard server platforms 102 (a node), e.g., Intel® based servers, to provide resilient block, object and file storage access. The dashed box identifies node 102 as a particular grouping of devices that are co-located and some or all of which may be disposed within a single device, enclosure, rack, etc. And while only one node 102 is called out in the illustration, this is for clarity in presentation. There typically are multiple such nodes, and in the illustration there are at least three such nodes illustrated with ellipses representing more nodes that may be present that are not illustrated. Ceph provides fault tolerance by breaking data 104 into "objects" and distributing the objects across a cluster 106. Ceph typically ensures data integrity by routinely scrubbing data with a scrub 108 process, finding object corruptions, reporting 110 errors to a Ceph Object Storage Daemon (OSD) 112 responsible for the affected data 104, and automatically fixing the corrupted objects by getting 114 corrected replica data from a redundant OSD 116 data 118 and updating 120 the corrupted data.

Ceph deployments begin with setting up Ceph Nodes 102 which include a grouping 122 of target disks, processor, scrub process, etc., and an OSD 124 responsible for the machine 122 disk(s). Nodes may be interconnected by way of a network 126 and a Ceph Storage Cluster, e.g., cluster 106. In one example, the Ceph Storage Cluster requires at least one Ceph Monitor (not all referenced components are illustrated) and at least one Ceph Object Storage Daemon (OSD) 112. It will be appreciated that in various embodiments there can be other OSDs, e.g., 116. There can also be a Ceph Metadata Server for running Ceph Filesystem clients. The Ceph OSDs stores data, handle data replication, recovery, backfilling, and rebalancing. The Ceph Monitor, among other things, tracks maps indicating cluster state (e.g., monitor map, OSD map, Placement Group (PG) map, and CRUSH map). The Ceph Metadata Server (MDS) stores metadata on behalf of the Ceph Filesystem (i.e., Ceph Block Devices and Ceph Object Storage do not use MDS). Ceph provides for automated scrubbing, a background operation in Ceph for maintaining data integrity as well as resiliency against drive data corruptions. It will be appreciated Nodes and/or Clusters may be interconnected by way of a network 126 or other communicative coupling.

When Ceph is provisioned using disaggregated storage targets, e.g., disk(s) target(s) 126, 128, 130 with Nonvolatile Memory Express over Fabrics (NVMe-oF) targets, the scrub 108 process overhead increases since each remote disk's data will be read over the locally attached PCIe fabric or over the network in order to allow its managing OSD to validate the stored objects. This overhead is multiplied by each remote target that needs to be validated. During scrubbing an OSD checks metadata related to stored objects to detect corruption. In one embodiment, the Ceph OSD reads all the objects and metadata (a disk Input/Output (IO) intensive task), calculates a type of checksum on the data (e.g., a compute intensive task such as crc32c), and compares validation data across replicas. For example, in the illustrated embodiment, reported 110 results may be compared with CRC data obtained of replicated data in other targets 128, 130. This testing detects missing objects, bitrot, failing disks, or other events causing object corruptions. The OSD that detects the error is responsible for updating its corrupted copy by obtaining 114, a correct copy. Unless a drive is failing, typically there are few errors so data transfers related to correcting errors in disaggregated storage tends to be a small percentage of overall data stored.

It will be appreciated after a certain number of errors, embodiments may elect to take storage offline and replace it. And as will be discussed further with respect to FIG. 3, in one embodiment the overhead of reading all or substantially all of the disk target data over a PCIe fabric or over a network can be largely eliminated by moving 132 the scanner to scrub storage to be local to the targets, e.g., collocated with the data 104, 118, etc. and allow for only errors to be sent across the network for verification and correction.

Figure 2:
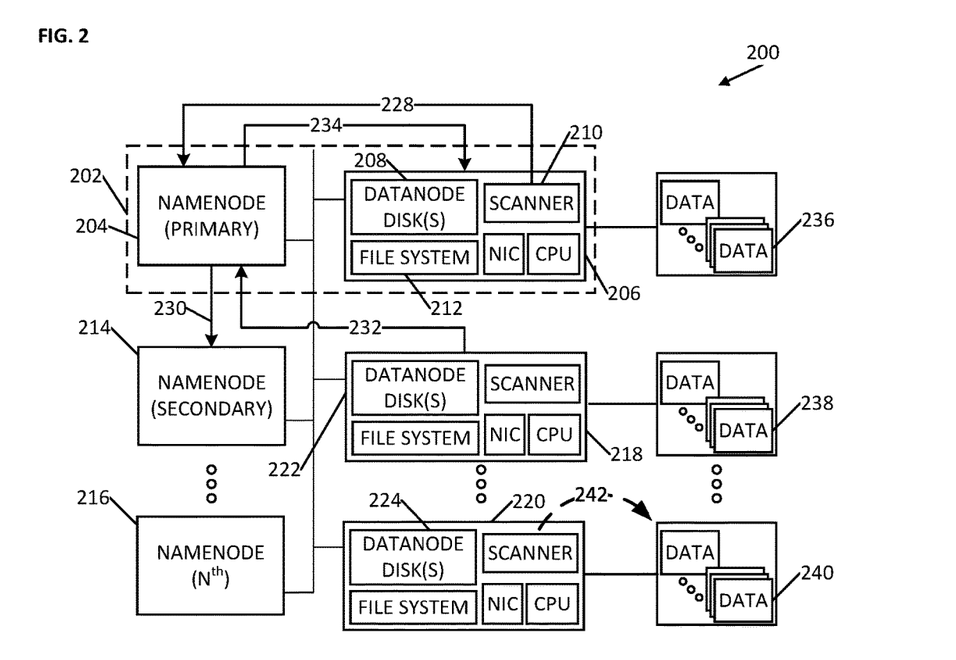
FIG. 2 illustrates an exemplary data storage environment modeled after a typical Hadoop® installation.

FIG. 2 illustrates an exemplary data storage environment 200 based in part on a typical Hadoop® installation. The Hadoop® framework provides a Hadoop® Distributed File System (HDFS) as shared file system also designed to operate on a large number of standard server platforms 202, e.g., Intel® based servers that do not share memory or storage. As illustrated a primary NameNode 204 and DataNode machine 206 (illustrated are a machine including the DataNode Disk(s) 208, scanner 210, native filesystem 212, etc.) The HDFS permits storage and access of large data sets across all nodes 204, 214, 216 in a Hadoop® cluster. HDFS separates large volumes of data into data blocks that are managed from various interfaces in the cluster. Data blocks are redundantly stored in multiple hardware locations 206, 218, 220. The HDFS is a filesystem that sits on top of a host computer's native file system, e.g., file system 212, allowing Hadoop® to operate on top of many different operating systems. Hadoop® implements massively parallelizable job executions in a cluster such as the MapReduce job (e.g., using the YARN, Pig, Hive, Flume, etc. architectures) which implements a Map job to sort and filter a data set into a form suitable for analysis, and a Reduce job that processes Map output and summarizes it, e.g., performing operations on the database to identify desired data. Hadoop® tracks where data resides, including copies for redundancy.

Individual servers index their data and index data is provided to the MapReduce task which then reduces information from servers into a unified data set. The scanner 210 provides background scrubbing of Hadoop® data, where each Hadoop® node 204, 214, 216 actively scans all HDFS partitions in their DataNodes 208, 222, 224 for corruption. If corrupted data is found by a scanner 210, e.g., in DataNode 206, the location reports 228 the error to its Primary Node, e.g., node 204. The Primary Node, as in understood by one skilled in the art, identifies a backup Secondary Node 214 from which it can request 230 corrected data, which the Secondary Node provides 232 the corrected data and the Primary Node can update 234 the corrupted data. A server may track multiple data volumes and hence have multiple scanning operations running concurrently. When Hadoop® is provisioned using disaggregated storage targets, e.g., when the DataNodes 208, 222, 224 use storage such as Nonvolatile Memory Express over Fabrics (NVMe-oF) targets, the scanner process, e.g., scanner 210, overhead increases since each target will be read over the network in order to allow its data to be validated.

In one embodiment the overhead of reading all or substantially all of a DataNode's disaggregated data over a network can be minimized by moving 232 the scanner to be local to the data, e.g., 236, 238, 240, etc., and the storage controller, for example the NVMe-oF controller may attempt to locally repair corrupted data and if that is not possible, then require only errors and control to be sent across the network for verification and correction.

As discussed above with respect to FIG. 1 and FIG. 2, scrubbing a disk typically requires investigating all of stored data, and when storage is not local to the scrubbing operation, e.g., storage is on a network or otherwise remotely located to the scrubber, there is substantial overhead in scrubbing data. One way to reduce overhead includes relocating the scrubbing operations to be local to the storage media (or drive) and then modifying the storage system, such as Ceph or Hadoop®, to use a scrubbing system that can work locally and only report back inconsistencies rather than transfer all data. This type of solution can be used with any type of storage since the identification and correction of data is performed by the storage system's scrubbing implementation. In one embodiment, detection of errors is incorporated into the storage technology, e.g., within a disk, target controller, etc. The storage technology can take advantage of routine drive background operations to incorporate periodically inspecting stored data and identify a specific storage location on the storage that is incorrect. The storage technology may then report this location to the storage system, which in turn can identify corrected data for the specific storage location and return it to the drive for correcting the data error.

Figure 3:
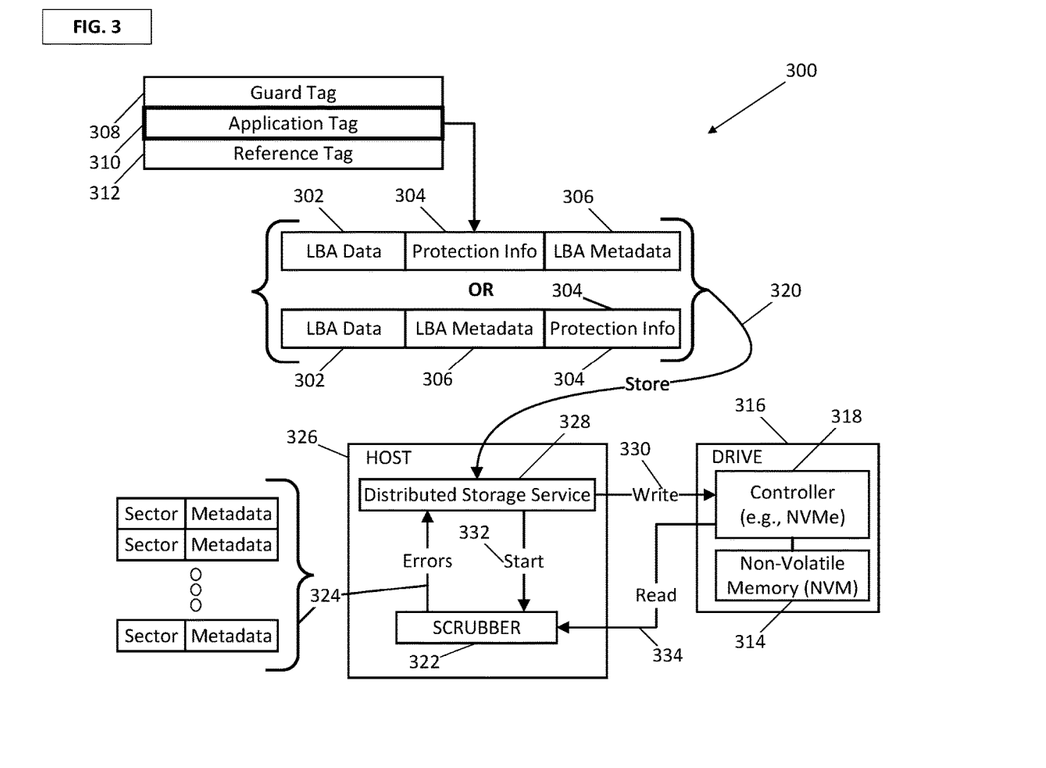
FIG. 3 illustrates an exemplary data storage environment providing disk-based scrubbing.

FIG. 3 illustrates an exemplary data storage environment 300 providing disk-based scrubbing. In a conventional disk, when an operating system function is called to write data to the storage, the data is written out in chunks that are dependent on the formatting that was performed on the drive. In the illustrated embodiment, written data is stored along with data to facilitate determining a specific host data block that was written based on the information stored along with that data. Logical block addressing (LBA) data 302 is written out to storage, along with Protection Information (PI) 304, and LBA Metadata.

As is understood by one skilled in the art, LBA is a well-known approach to identifying the location of blocks of data within the storage. The LBA metadata 306 may be treated as containing the host data (data blocks) being written, e.g., host blocks are the data thought of as being written to a disk when stored 320. However, the data blocks may be separate from but associated with the metadata 304-306 (see also FIG. 6 metadata 612-614) for the data blocks. The PI may store a Guard Tag 308, Application Tag 310, and Reference Tag 312. In the illustrated embodiment, the PI may be a sub-set of the LBA Metadata, but it will be appreciated in an alternate embodiment it may be a separate block of data. The Guard Tag 308 protects against errors in the data. Assuming for example the Guard Tag is two bytes, it can be used to encode a Cyclic Redundancy Check (CRC) or other validation computation for the data in the data block. This allows an end-to-end ability to validate data, e.g., from host 326 hardware/software decision to write to actually writing the data, the validation data travels with the data and every device along the path to storage may validate that the data in the block is still correct. The storage may also check the data is correct before writing it out. In a related fashion when data is read from storage the validation data may be used to confirm the data read from storage is correct. As will be discussed further below, the storage may also track and report any errors that are identified when the data is not accessible during background operations.

The Application Tag 310 may also be two bytes, and is typically used by applications to add additional validation data to each data block. For example, data structure information about how data is written to disk, such as RAID information, or data about how Ceph or Hadoop® data is structured might be encoded. Since the Application Tag is typically created at a high level, such as by the software or hardware initiating the write request, hence it can be set to contain validation data that could be checked by storage devices (or arbitrary data). The Reference Tag 312 may be four bytes, and contains block address information. As data transfers through a machine, network, controllers, or the like, data might inadvertently get addressing errors and this data may be used to tag data with address and sequencing information to allow correct reconstruction of the data even if blocks are received out of order. This information also facilitates faster data mapping between logical objects that become corrupted that are associated with corrupted LBA locations identified/reported by the storage. Under the T10 standard the Protection Information implements the Guard Tag 308, Application Tag 310 and Reference Tag 312 an optional set of features in the Small Computer System Interface (SCSI) Block Commands protocol (SBC).

With availability of data validation and integrity provided by DIM and DIF (Data Integrity Field) technology, NVMe 1.2.1 (see, URL www.nvmexpress.org/wp-content/uploads/NVM_Express_1_2_1_Gold_20160603.pdf at, e.g., sec. 8.3 "End-to-end Data Protection") provides an optional end to end data protection based on SCSI T10 discussed above that can be used with nonvolatile media (NVM) disk storage technology. Such technology becomes increasingly important as higher density NVM media is developed, e.g., newer 3D NAND stacking techniques for making larger density drives. With these larger, denser, more complex designs it becomes ever more important to be able to validate drive data, recognize when data regions are failing, and automatically identify, and correct, corrupted data (which may need automatic relocation to a reliable location on the storage), for example, when the corrupted data cannot be automatically repaired with internal drive protection.

DIF, and a Data Integrity Extension (DIX) may be used with NVMe and NVMe-oF storage media, e.g., SSD disks. It will be appreciated arbitrary validation data (e.g., the illustrated Protection Information 304) may be stored 320 in storage (e.g., Drive 316) along with data to be stored. In one embodiment a CRC (e.g., CRC-16, CRC-24, etc.) is stored in the PI metadata and added to the logical block or sector being written. This DIX metadata may be used by a host 326 (e.g., implementing a FIG. 1 Ceph or FIG. 2 Hadoop® environment) and/or Controller 318 to help determine the integrity of a logical block 302 that is stored (written), or validated (e.g., reading back and comparing computed validation data to stored validation data). In one embodiment the PI uses 8 bytes, however size limits are arbitrary and software and/or hardware, controllers, or the like may use different metadata sizes as desired for end-to-end and/or drive-based validation.

End-to-end data protection is a good mechanism to detect errors at the time of host 10, e.g., a host 326 may use a distributed storage service 328 that writes 330 data 302 and associated PI 304 and other metadata 306 to a drive 316, and starts 332 a scrubber 322 operation that reads 334 data from the drive 316 (e.g., by way of its Controller 318), and the scrubber reports out the errors 324 (e.g., the sector/metadata identifying locations on disk having trouble that the host 326 may use to reverse-lookup and correct the affected data blocks. However, it is not efficient for performing integrity checks on large disks in part because typically all data on the disk needs to be accessed over the link to the drive, and this represents a lot of work that is made more problematic for distributed storage, e.g., when the write 330 and read 334 is occurring over a network (see, e.g., FIG. 6).

As drive densities continue to increase (e.g., a 16 TB+ drives are available, and soon these will be considered small), background checking becomes an increasingly serious problem. Background scrubbing may be improved by applying the end-to-end data protection principles as discussed to storage data integrity checks. In one embodiment, the storage media in drive 316 is a Non-Volatile Memory (NVM) 314 solid-state disk (SSD). In one embodiment, the NVM is or includes a memory device is that a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

The memory's controller 318, e.g., a NVMe controller, performs various tasks such as garbage collection as well as background tasks such as wear-levelling to identify regions of storage media that may be failing. These operations are directed by a Scrubber 322 that as discussed above performs wear-leveling as well as data integrity tests by reading back written data 302 and computing protection information for that data and comparing it to the stored PI 304. In this embodiment, the Controller offloads work from the host 326 and extends background validation to look for corrupted sectors using the data provided in the PI 304, e.g., as discussed above in DIX may be a CRC checksum, or other validation data depending on the disk integrity data (DID) in use. In such fashion the scrubber can determine portions of a NVM that are failing, as well as data that reads fine but for some reason does not validate, e.g., the PIs do not match.

As with encoding storage for a particular DID to use, routine background validation may be determined (or programmed) during namespace creation and set how frequently the drive 316 should sweep through data on associated disks, e.g., NVM 314, for identifying corrupted logical blocks. Note although only one drive 316 is shown with only one NVM 314 it will be appreciated multiple NVM disks may be implemented. It will be further appreciated the drive may contain circuitry to control reviewing the NVM or the NVM may contain circuitry to perform the check itself. In one embodiment, the check may be controlled by standard NVMe administrative commands (or, as it will be appreciated, a proprietary vendor extension) which can be scheduled by the host software, or in some embodiments, automatically performed by circuitry within the drive 316 or the storage itself, e.g., NVM 314. It will be appreciated the same solution may be applied regardless of whether the firmware and/or controller is implemented in host software, or within circuitry within storage.

Figure 4:
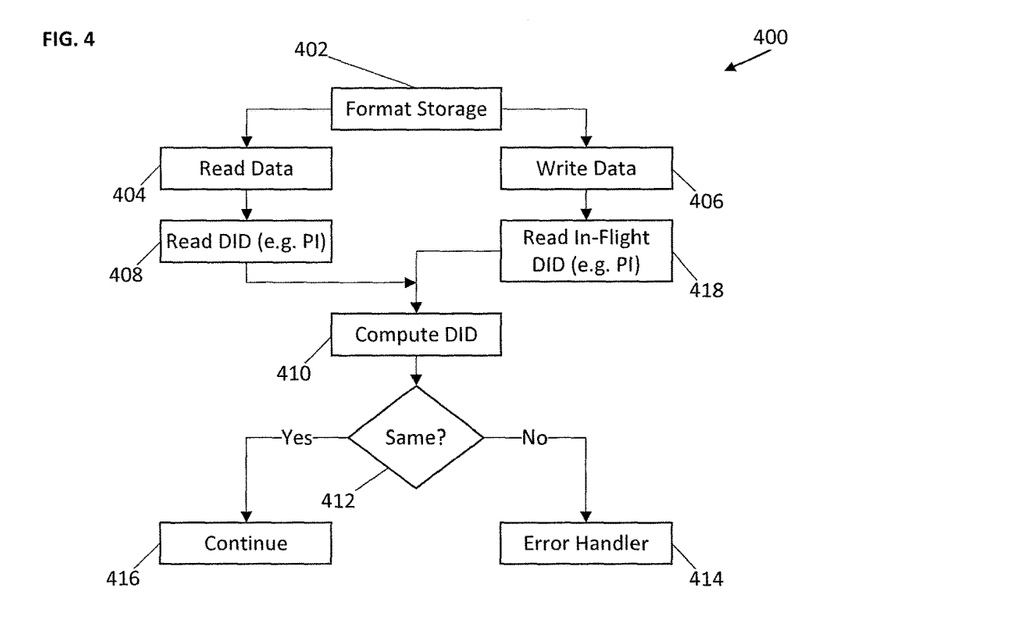
FIG. 4 illustrates an exemplary flow-chart showing operations for utilizing storage with disk integrity data provided along with stored data.

FIG. 4 illustrates, according to one embodiment, a basic flow-chart 400 showing operations for utilizing storage with disk integrity data (DID), such as DIX, DIM, etc., provided along with stored data. It will be appreciated DID structure is likely applied when drive namespace is formatted 402 with a desired protection information technique. However, in some embodiments it is possible for the DID format to be changed on the fly if the status of the storage media or other data suggests this would be helpful. It will be appreciated that many different formats may be used, including a RAID (redundant array of independent disks) type of format that stripes data across a disk along with some form of DID. Striping data may help minimize data loss to a section of storage failing by distributing data that might typically be in one area across multiple areas.

When host hardware/software (e.g., FIG. 3 host 326) performs a read 404 or write 406 request, the storage controller (or other machine/device/software making the request) may check for corrupted block data. A particular DID in use for a storage device is typically known, though it will be appreciated in one embodiment, the storage media may actually include an encoding of a desired validation technique that is to be used, e.g. a particular proprietary CRC technique. In a read 404 operation the storage controller would read 408 the DID information (e.g., FIG. 3 PI 304 information) previously written to storage, and also compute 410 what the DID should be. The result is compared and if 412 the comparison is not a match, then error processing is performed 414. If 412 the comparison is a match, then processing continues 416. Similarly, when there is a write 406 operation, as discussed above, the DIX, DIM, etc. protocols provide DID data (e.g., FIG. 3 PI 304 information), was written to storage along with the data (e.g., FIG. 3 LBA Data 302). During a write operation, the storage controller (or other machine/device/software making the request) may check for corrupted block data by reading 418 the in-flight DID and compute 410 what the DID should be. As with the read operation, the result is compared and if 412 the comparison is not a match, then error processing is performed 414. If 412 the comparison is a match then processing continues 416.

Figure 5:
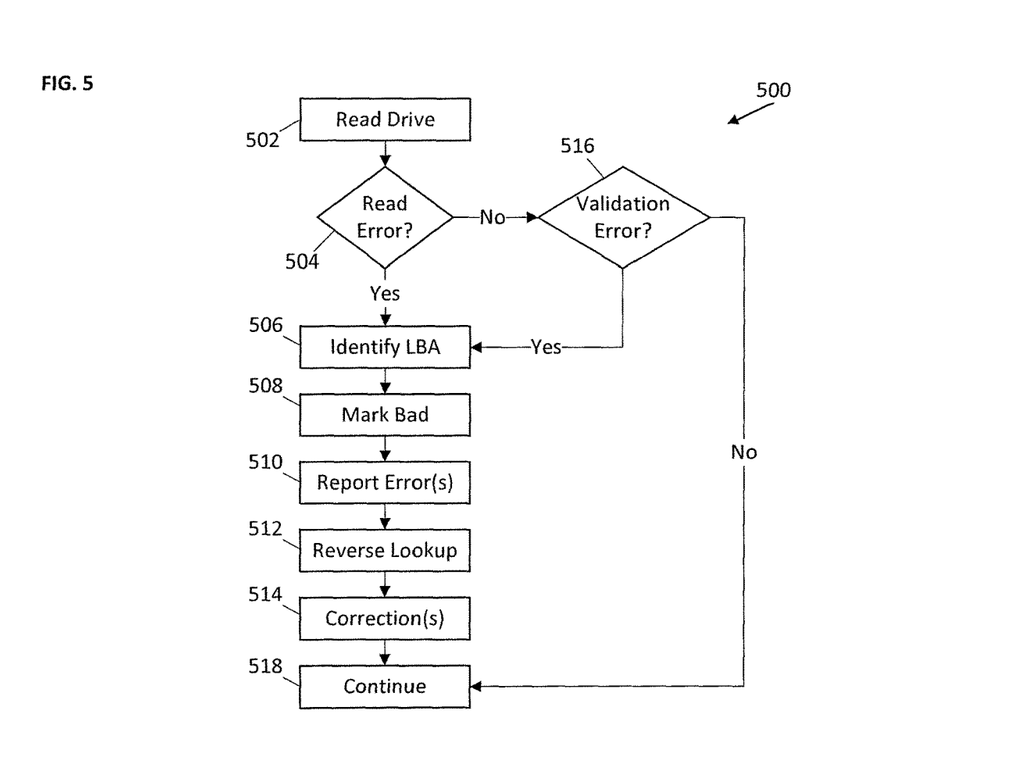
FIG. 5 illustrates exemplary circuitry sweeping an associated drive for corruption.

FIG. 5 illustrates, according to one embodiment, circuitry for 500 sweeping an associated drive for corruption. For expository convenience, discussion will cross-reference with FIG. 3, and let's assume the FIG. 3 Controller 318 is reviewing NVM 314, but it will be appreciated this activity could be performed by or in conjunction with circuitry in the drive 316 or the NVM 314. The controller starts reading 502 the content of associated storage such as NVM 314. It will be appreciated by one skilled in the art this is a gross simplification of the background operations the controller would perform for general maintenance/health checking of nonvolatile media.

As illustrated one test that may be performed to confirm reading 502 data on the storage is successful. If 504 there is a read error then it will be appreciated that a drive has encountered an error and the affected disk portion may be marked as bad, and because the controller understands the disk layout, it can identify 506 the specific LBA region(s) affected, mark them 508 bad, and report 510 the errors to the host software for correction. It will be appreciated that since the host software must know both LBA and its associated data that was written, the host operating system (OS) can reverse-lookup 512 the data in its system. That is, in one embodiment, the affected Ceph or Hadoop® environment, in order to request data to be written, must know the data and protection information along with the LBA information relating to the logical location of the data to be placed on the drive 316. Knowing this, when the controller 510 receives an error, it has enough information to give host software, such the software used in Ceph, Hadoop®, distributed databases, large datasets, artificial intelligence, genomics, etc. to reverse-lookup 512 a store request to identify the impacted original-data and get a corrected 514 copy for writing back to the drive.

However, if 504 the read test does not give an error relating to a physical error in the storage, such as degrading NVM, data that is read can be tested to determine if 516 the read data passes a validation check. As noted previously, the PI or other data associated with LBA Data 302 can be arbitrarily complex, but known (e.g., in a standard), and may be computed and compared against validation data that was computed by host software, e.g., the Ceph or Hadoop® system, for storing 302 to a drive 316. If 516 there is a read error then the Controller 318 can identify 506 the specific LBA region(s) affected, and report 510 the errors to the host software for reverse-lookup 512 and correction 514. After determining if 504, 516 there were errors, and handling/correcting 512, 514, processing can continue 518, e.g., continuing with the background processes or other tasks.

Returning to FIG. 3 for a moment, if a controller such as Controller 318 does not provide a mechanism for sweeping through a storage for corruptions, it will be appreciated that a host software and/or hardware based scrubbing service, e.g., host 326 scrubber 322, may be used to direct a drive 316 or its controller 318 to systematically review associated storage, e.g., NVM 314 and compile a list of corrupted block errors 324 to be corrected. In one embodiment drive review is asynchronous to and autonomous of drive use. In one embodiment, the scrubber service may coordinate storage review using a selected one or more of a request/response notification arrangement, or an asynchronous notification channel, for communicating with storage. In one embodiment drive validation may be a low-level procedure optimized to take advantage of drive sequential IO bandwidth and be integrated with distributed storage software, if available. Host scrubbing software 322 performing the review, in one embodiment, reads LBA range and read IO fails, and flags as corrupted the unreadable or unverifiable blocks during sweeping process. It will be appreciated that when utilizing low level IO operations, overhead associated with traversing distributed storage software is reduced, freeing up host processor and other resources for other tasks.

Figure 6:
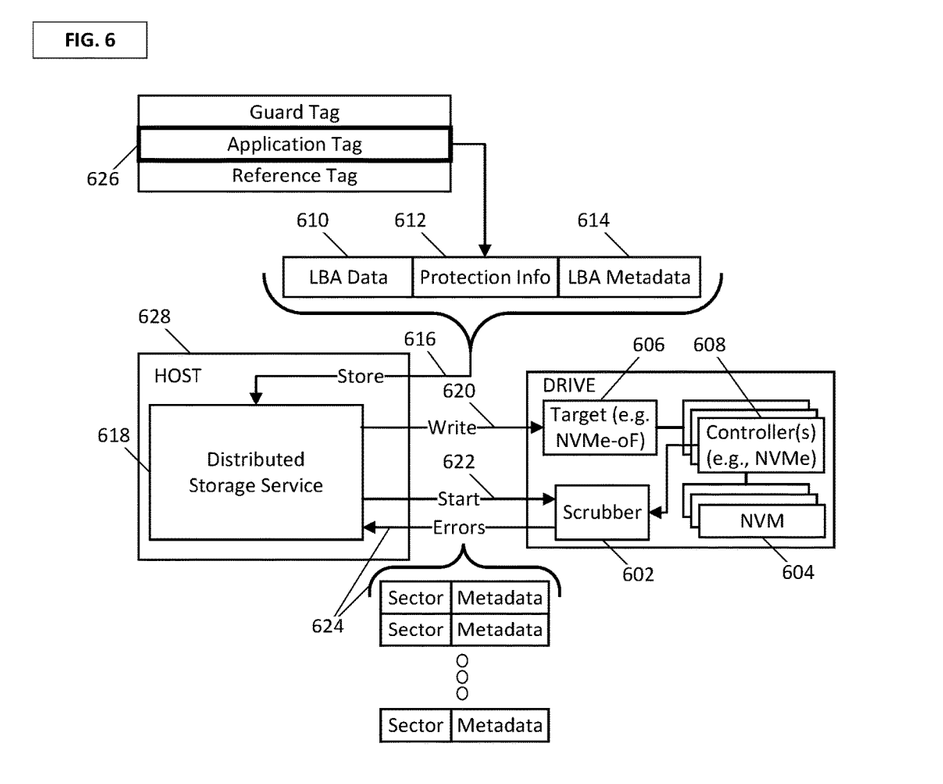
FIG. 6 illustrates a variation on the FIG. 3 embodiment where the FIG. 3 scrubber 322 is located local to a drive being validated.

FIG. 6 illustrates a variation on the FIG. 3 embodiment where the FIG. 3 scrubber 322 is located local to a drive being validated. The principles of FIGS. 3-5 apply to FIG. 6 as applied to a distributed storage environment with disaggregated disks. Distributed storage typically proactively performs integrity checks by doing routine background scrubbing with a scrubber 602 for all storage, e.g., NVM(s) 604, for which it is responsible to help ensure there are no corruptions. If there are corruptions, host 628 software such as that used in FIG. 1 Ceph or FIG. 2 Hadoop® will be able to obtain an uncorrupted copy from a replica in a data cluster and replace the corrupted block. But to identify the error, background scrubbing is disk 10 intensive, compute intensive (the many hash/CRC/other calculations), and network intensive as the entire disk must typically be transferred over the communication path between the host software/circuitry driving the checking and the drive being checked.

As illustrated, the scrubber 602 is local to, e.g., co-located with or otherwise available to storage, e.g., one or more NVM 604 operating as, for example, NVMe-oF targets 606 communicatively coupled with Controllers 608 which in this example are NVMe controllers for accessing the NVM 604 storage. LBA Data 610, Protection Information (PI) 612 and LBA Metadata 614 is generated as discussed above with respect to FIG. 3.

When a store 616 request is received, whether by way of host software, e.g., FIG. 1 Ceph environment, or FIG. 2 Hadoop® environment, or from another source, the request is received by a Distributed Storage Service 618 (DSS). In the illustrated embodiment since disaggregated storage is being used, the DSS sends a write 620 request to the Target 606 which in turn interacts with the Controller(s) 608 for the NVM(s) 604 storage. Periodically, the DSS may send a start 622 scrubbing command to a Scrubber 602, which as noted above, unlike the FIG. 3 embodiment, the scrubber is co-located with the NVM(s) 604. It will be appreciated that DSS circuitry and/or controlling software typically deals with volumes, objects and shards. In one embodiment, the drive provides logical byte address (LBA) for corrupted sectors. In one embodiment, the scrubber is a generic service expected to issue low-level sequential IO calls to reduce need for expensive deep-IO path traversal for a disaggregated storage service. A conventional storage service typically employs locking for the region it is scrubbing and consequently may have data locked for an extended time as it takes the data path, similar to client IO request, to identify corrupted blocks. This is compute intensive. Low level block IO in scrubbing service will not use any locks which will significantly reduce the scrubbing time.

If the scrubber 602 identifies an error accessing the NVM 604 or validating stored data, e.g., validating stored data with some or all of metadata 610-614, the scrubber may compile a list of errors 624 containing, for example, at least the sector and matadata on the NVM affected by the failed read/validation attempt, and provide the errors back to the DSS. While local placement of the scrubber will greatly improve scrubbing remotely located storage, as noted above, it would be quite burdensome for the DSS to have to read an entire NVM over the network or other communication path communicatively coupling the DSS to the Target. The illustrated reporting of just errors to the DSS alleviates burdens on the network, and other hardware and/or software communicating with the Target(s) 606.

The Distributed Storage Service 618 (DSS), in one embodiment, issues IO to a Controller 608 that includes a CRC and optionally application metadata in the Protection Information 612. Application metadata may be used to assist with reverse lookup, which is important for correlating corrupted objects that need be fixed, in accordance with embodiments. It is assumed the metadata is opaque to the controller and meant for reverse lookup usage. It will be appreciated this approach requires taking up storage space with this data, but reduces the need to construct reverse lookup tables which may introduce latency due to locking requirements and processor resources required to do large-scale distributed lookups. Thus the DSS may perform a reverse lookup from LBA sector information using the LBA Metadata and host object format, and since this is an error correction, use the data to determine the Ceph, Hadoop®, etc. object that cannot be read and/or validated and get a corrected copy, e.g., from a mirroring host or the like.

It will be appreciated there are multiple different ways to perform the reverse lookup. One exemplary way is, if the Controller 608 provides meta-data sizes large enough to tag an object (that is, the data being written) with at least its LBA location, then written data will simply incorporate this information and the DSS host software may then directly utilize this information to perform a reverse lookup. Alternatively, if the Controller does not provide metadata large enough to store the desired information for a direct reverse lookup, then the Application Tag 626 may be encoded with information needed to perform the reverse lookup and this information returned by the Controller 608 to the scrubber 602 which in turn returns it to the DSS for performing the reverse lookup.

In yet another alternative, the DSS host hardware and/or software may maintain lookup tables for object to LBA mapping which may be used to speed up corrupted objects identification and correction. In one embodiment, the DSS will use the errors 624 list identifying, for example, failed sectors, as hints only and the DSS will redo the error validation with concurrency control to ensure consistency of the data. It will be appreciated this may be needed because data will be changing during scrubbing process and there is no guarantee the corrupted block remains valid. It will be appreciated that in a distributed storage environment, there may be petabytes or more of data in storage racks, server rooms, etc. Reducing the DSS workload to only redoing possible errors 624 represents a meaningful optimizing of integrity checking, both speeding up background scrubbing while also reducing processor loads in performing the scrubbing.

Figure 7:
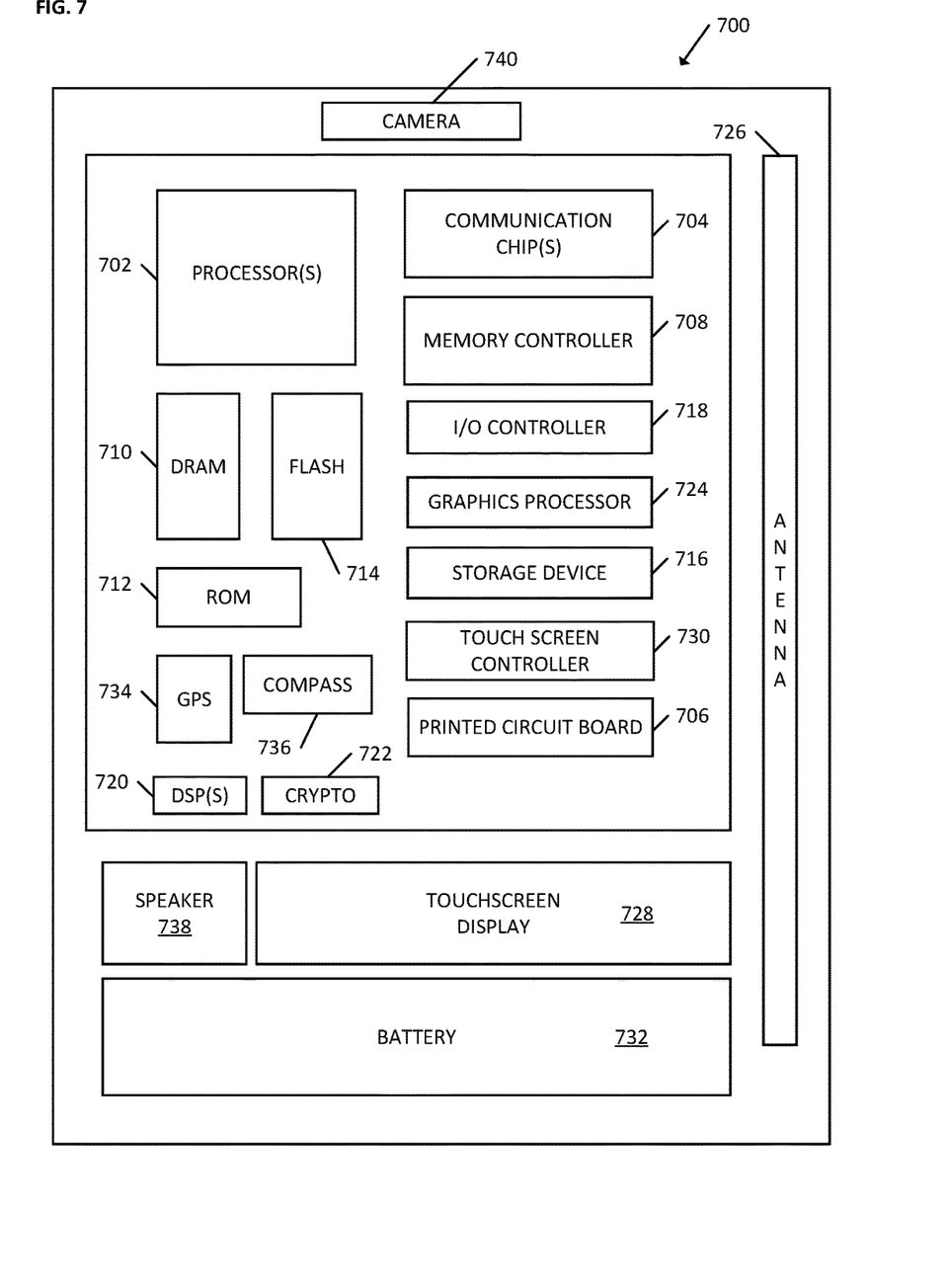
FIG. 7 illustrates an exemplary computer device that may employ the apparatuses and/or methods described herein.

FIG. 7 illustrates an example computer device 700 that may employ the apparatuses and/or methods described herein, in accordance with various embodiments. As shown, computer device 700 may include a number of components, such as one or more processor(s) 702 (one shown) and at least one communication chip(s) 704. In various embodiments, the one or more processor(s) 702 each may include one or more processor cores. In various embodiments, the at least one communication chip 704 may be physically and electrically coupled to the one or more processor(s) 702. In further implementations, the communication chip(s) 704 may be part of the one or more processor(s) 702. In various embodiments, computer device 700 may include printed circuit board (PCB) 706. For these embodiments, the one or more processor(s) 702 and communication chip(s) 704 may be disposed thereon. In alternate embodiments, the various components may be coupled without the employment of PCB 706.

Depending on its applications, computer device 700 may include other components that may or may not be physically and electrically coupled to the PCB 706. These other components include, but are not limited to, memory controller 708, volatile memory (e.g., dynamic random access memory (DRAM) 710), non-volatile memory such as read only memory (ROM) 712, flash memory 714, storage device 716 (e.g., a hard-disk drive (HDD)), an I/O controller 718, a digital signal processor 720, a crypto processor 722, a graphics processor 724 (e.g., a graphics processing unit (GPU) or other circuitry for performing graphics), one or more antenna 726, a display which may be or work in conjunction with a touch screen display 728, a touch screen controller 730, a battery 732, an audio codec (not shown), a video codec (not shown), a positioning system such as a global positioning system (GPS) device 734 (it will be appreciated other location technology may be used), a compass 736, an accelerometer (not shown), a gyroscope (not shown), a speaker 738, a camera 740, and other mass storage devices (such as hard disk drive, a solid state drive, compact disk (CD), digital versatile disk (DVD)) (not shown), and so forth.

In some embodiments, the one or more processor(s) 702, flash memory 714, and/or storage device 716 may include associated firmware (not shown) storing programming instructions configured to enable computer device 700, in response to execution of the programming instructions by one or more processor(s) 702, to practice all or selected aspects of the methods described herein. In various embodiments, these aspects may additionally or alternatively be implemented using hardware separate from the one or more processor(s) 702, flash memory 714, or storage device 716.

In various embodiments, one or more components of the computer device 700 may implement an embodiment of node 102, host 326, drive 316 (or its associated components), etc. Processor 702 could be in host 326 and communicating with memory 710 though memory controller 708. In some embodiments, I/O controller 718 may interface with one or more external devices to receive a data. Additionally, or alternatively, the external devices may be used to receive a data signal transmitted between components of the computer device 700.

The communication chip(s) 704 may enable wired and/or wireless communications for the transfer of data to and from the computer device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 7G, and beyond. The computer device may include a plurality of communication chips 704. For instance, a first communication chip(s) may be dedicated to shorter range wireless communications such as Wi-Fi and Bluetooth, and a second communication chip 704 may be dedicated to longer range wireless communications such as GPS, EDGE, GPRS, CDMA, WiMAX, LTE, Ev-DO, and others.

The communication chip(s) may implement any number of standards, protocols, and/or technologies datacenters typically use, such as networking technology providing high-speed low latency communication. For example the communication chip(s) may support RoCE (Remote Direct Memory Access (RDMA) over Converged Ethernet), e.g., version 1 or 2, which is a routable protocol having efficient data transfers across a network, and is discussed for example at Internet URL RDMAconsortium.com. The chip(s) may support Fibre Channel over Ethernet (FCoE), iWARP, or other high-speed communication technology, see for example the OpenFabrics Enterprise Distribution (OFED™) documentation available at Internet URL OpenFabrics.org. It will be appreciated datacenter environments benefit from highly efficient networks, storage connectivity and scalability, e.g., Storage Area Networks (SANS), parallel computing using RDMA, Internet Wide Area Remote Protocol (iWARP), InfiniBand Architecture (IBA), and other such technology. Computer device 700 may support any of the infrastructures, protocols and technology identified here, and since new high-speed technology is always being implemented, it will be appreciated by one skilled in the art that the computer device is expected to support equivalents currently known or technology implemented in future.

In various implementations, the computer device 700 may be a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder, or a transportation device (e.g., any motorized or manual device such as a bicycle, motorcycle, automobile, taxi, train, plane, etc.). In further implementations, the computer device 700 may be any other electronic device that processes data.

Figure 8:
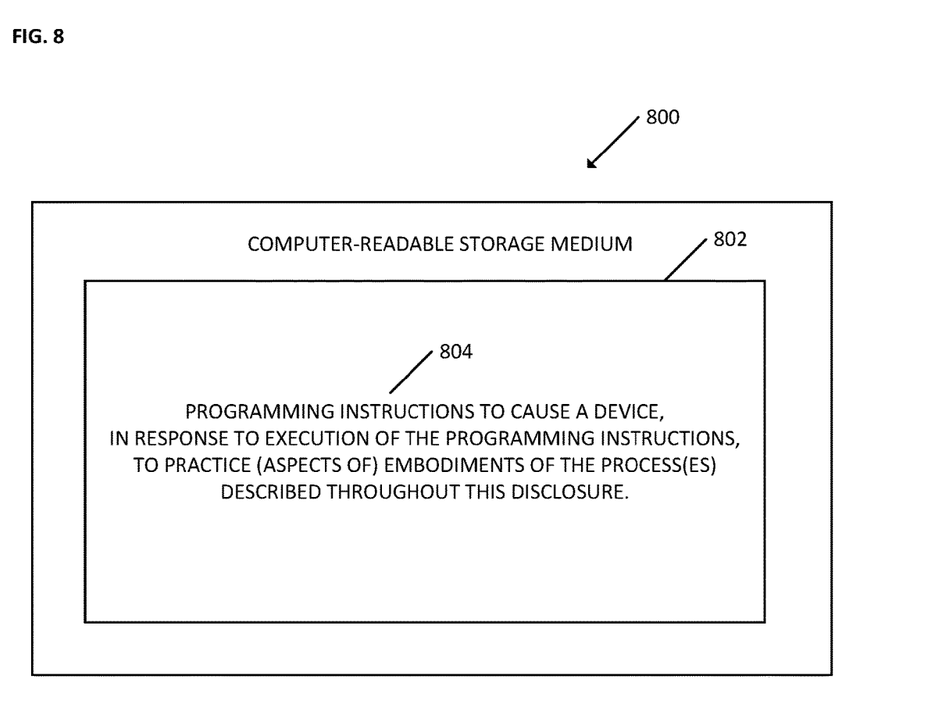
FIG. 8 illustrates an exemplary computer-readable non-transitory storage medium.

FIG. 8 illustrates an example computer-readable non-transitory storage medium 800 that may be suitable for use to store instructions that cause an apparatus, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 802 may include a number of programming instructions 804. Programming instructions 804 may be configured to enable a device, e.g., hosts 326, 628, in response to execution of the programming instructions, to implement (aspects of) the sidecar technology disclosed herein. In alternate embodiments, programming instructions 804 may be disposed on multiple computer-readable non-transitory storage media 802 instead. In still other embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example 1 may be a nonvolatile memory (NVM) communicatively coupled to a distributed storage service (DSS), the DSS having a scrubber to validate data stored by the DSS on the nonvolatile memory, comprising: a first background task to review NVM operation to identify a first potential error; and a second background task operable to read a block of data from the NVM having a first portion containing data and a second portion containing validation information for the data, determine a reference validation for the data, and compare the reference validation to the second portion to identify a second potential error; wherein the first and second potential errors are selectively reported to the scrubber.

Example 2 may be example 1, wherein the NVM has a format having a known validation function, and wherein the determine the reference validation for the data is based at least in part on applying the validation function to the data of the first portion.

Example 3 may be example 1, wherein the NVM has a physical structure with a format having a logical layout corresponding to the physical structure, the first background task further to: fail to successfully read a physical portion of the NVM; fail to automatically relocate data stored at the physical portion; identify a first portion of the logical layout corresponding to the physical portion; and include the first portion in the first potential error.

Example 4 may be example 3, the second background task further to automatically: identify a second portion of the logical layout corresponding to the block of data; and include the second portion in the second potential error.

Example 5 may be example 1, wherein the validation data includes Disk Integrity Data incorporating selected ones of Data Integrity Field (DIF), Protection Information (PI), Data Integrity Extension (DIX), and Application Tag.

Example 6 may be example 1, in which the scrubber is disposed with the DSS and the NVM is a remote target of the DSS, further comprising: wherein the scrubber is to validate substantially all of the NVM, but wherein the NVM self-inspects to offload scrubbing from the scrubber and only reports to the scrubber portions of the NVM corresponding to the first and second errors.

Example 7 may be example 6 wherein the total size of reported portions of the NVM represents less than 10% of the total size of the NVM.

Example 8 may be example 1, wherein the NVM is disposed within a machine, the machine comprising: a controller to receive a write request from the DSS including at least data and metadata associated with the data to store on the NVM; wherein the controller controls the first and second background tasks based at least in part on the validation data.

Example 9 may be example 8, wherein the metadata includes at least one tag to facilitate identifying a mapping between a logical object written by the DSS to the NVM, and one or more LBA locations on the NVM for storing the logical object.

Example 10 may be example 1 wherein a namespace creation for the NVM includes encoding in the NVM a schedule for performing the first background task, and wherein the second background task is performed during selected ones of the first background task.

Example 11 may be example 1, wherein the NVM is one of a cluster of NVM providing distributed storage for the DSS.

Example 12 may be example 1 or 2, wherein the NVM has a physical structure with a format having a logical layout corresponding to the physical structure, the first background task further to: fail to successfully read a physical portion of the NVM; fail to automatically relocate data stored at the physical location; identify a first portion of the logical layout corresponding to the physical portion; and include the first portion in the first potential error.

Example 13 may be any of examples 1-3, wherein the validation data includes Disk Integrity Data incorporating selected ones of Data Integrity Field (DIF), Protection Information (PI), Data Integrity Extension (DIX), and Application Tag.

Example 14 may be any of examples 1-5, in which the scrubber is disposed with the DSS and the NVM is a remote target of the DSS, further comprising: wherein the scrubber is to validate substantially all of the NVM, but wherein the NVM self-inspects to offload the scrubbing task from the scrubber and only reports to the scrubber portions of the NVM corresponding to the first and second errors.

Example 15 may be any of examples 1-7, wherein the NVM is disposed within a machine, the machine comprising: a controller to receive a write request from the DSS including at least data and metadata associated with the data to store on the NVM; wherein the controller controls the first and second background tasks based at least in part on the validation data.

Example 16 may be any of example 1-9 wherein a namespace creation for the NVM includes encoding in the NVM a schedule for performing the first background task, and wherein the second background task is performed during selected ones of the first background task.

Example 17 may be any of examples 1-10 wherein the NVM is one of a cluster of NVM providing distributed storage for the DSS.

Example 18 may be one or more non-transitory computer-readable media having instructions accessible by a machine including at least one processor, and at least one nonvolatile memory storage (NVM), the machine communicatively coupled to a distributed storage service (DSS) having a scrubber service to validate data stored by the DSS on the nonvolatile memory, that, in response to execution of the instructions by the machine, cause the machine to: review, as a first background task, NVM operation to identify a first potential error; and read, as a second background task, a block of data from the NVM having a first portion containing data and a second portion containing validation information for the data, determine a reference validation for the data, and compare the reference validation to the second portion to identify a second potential error; wherein the first and second potential errors are selectively reported to the scrubber.

Example 19 may be example 18, further including instructions to: identify a validation function corresponding to a format of the NVM; and determine the reference validation for the data based at least in part on applying the validation function to the data of the first portion.

Example 20 may be example 18, wherein the NVM has a physical structure with a format having a logical layout corresponding to the physical structure, the instructions for the first background task comprising instructions to: first test for failure to successfully read a physical portion of the NVM; second test for failure to automatically relocate data stored at the physical portion; identify a first portion of the logical layout corresponding to the physical portion; and include the first portion in the first potential error.

Example 21 may be example 20, the instructions for the second background task comprising instructions to automatically identify a second portion of the logical layout corresponding to the block of data; and include the second portion in the second potential error.

Example 22 may be example 18, in which the scrubber is disposed with the DSS and the NVM is a remote target of the DSS, further comprising instructions for the NVM to offload scrubbing from the scrubber by self-inspecting for errors and only report to the scrubber self-identified errors.

Example 23 may be example 18, wherein the NVM is disposed within the machine, the machine comprising: a controller to receive a write request from the DSS including at least data and metadata associated with the data to store on the NVM; and instructions, which when executed by the machine, direct the controller to control the first and second background tasks based at least in part on the validation data.

Example 24 may be any of examples 18 or 19, wherein the NVM has a physical structure with a format having a logical layout corresponding to the physical structure, the instructions for the first background task comprising instructions to: first test for failure to successfully read a physical portion of the NVM; second test for failure to automatically relocate data stored at the physical location; identify a first portion of the logical layout corresponding to the physical portion; and include the first portion in the first potential error.

Example 25 may be any of example 18-20, the instructions for the second background task comprising instructions to automatically identify a second portion of the logical layout corresponding to the block of data; and include the second portion in the second potential error.

Example 26 may be any of examples 18-25, in which the scrubber is disposed with the DSS and the NVM is a remote target of the DSS, further comprising instructions for the NVM to offload the scrubbing task from the scrubber by self-inspecting for errors and only report to the scrubber self-identified errors.

Example 27 may be any of examples 18-26, wherein the NVM is disposed within the machine, the machine comprising: a controller to receive a write request from the DSS including at least data and metadata associated with the data to store on the NVM; instructions, which when executed by the machine, direct the controller to control the first and second background tasks based at least in part on the validation data.

Example 28 may be a system comprising: a nonvolatile memory configured with autonomous self-validation circuitry to scrub the nonvolatile memory to identify errors within the nonvolatile memory; a distributed storage service including a scrubber communicatively coupled with the nonvolatile memory; wherein the scrubber automatically receives error reports from nonvolatile memory.

Example 29 may be example 28, further comprising: disposing the distributed storage service and the scrubber in a host; and disposing the nonvolatile memory and a controller in a disk configured to be a NVMe-oF target communicatively coupled with the host.

Example 30 may be example 28, further comprising: a local PCIe fabric communicatively coupling a selected one of the distributed storage or the scrubber with nonvolatile memory.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A nonvolatile memory (NVM) communicatively coupled to a distributed storage service (DSS), the DSS having a scrubber to validate data stored by the DSS on the nonvolatile memory, comprising:
   a first background task to offload the scrubber, including local review of NVM operation, within the NVM, to identify a first potential error; and
   a second background task to further offload the scrubber, including local read of a block of data from the NVM having a first portion containing data and a second portion containing validation information for the data, local determination of a reference validation for the data, and local comparison of the reference validation to the second portion to identify a second potential error, all performed within the NVM;

wherein the first and second potential errors are selectively reported to the scrubber.

2. The NVM of claim 1, wherein the NVM has a format having a known validation function, and wherein the local determination of the reference validation for the data is based at least in part on applying the validation function to the data of the first portion.

3. The NVM of claim 1, wherein the NVM has a physical structure with a format having a logical layout corresponding to the physical structure, the first background task is arranged to:

on failure to successfully read a physical portion of the NVM, and failure to automatically relocate data stored at the physical portion, identify a first portion of the logical layout corresponding to the physical portion; and include the first portion in the first potential error.

4. The NVM of claim 3, the second background task is further arranged to automatically:

identify a second portion of the logical layout corresponding to the block of data; and include the second portion in the second potential error.

5. The NVM of claim 1, wherein the validation information includes Disk Integrity Data incorporating selected ones of Data Integrity Field (DIF), Protection Information (PI), Data Integrity Extension (DIX), and Application Tag.

6. The NVM of claim 1, in which the scrubber is disposed with the DSS; the NVM is a remote target of the DSS; and the scrubber is to validate substantially all of the NVM;

wherein the NVM is further arranged to offload scrubbing from the scrubber, including performance of self-inspection, and only reports to the scrubber, portions of the NVM corresponding to the first and second potential errors.

7. The NVM of claim 6, wherein a total size of reported portions of the NVM represents less than 10% of a total size of the NVM.

8. The NVM of claim 1, wherein the NVM is disposed within a machine, the machine comprising:

a controller to receive a write request from the DSS including at least data and metadata associated with the data to store on the NVM;

wherein the controller is arranged to control the first and second background tasks based at least in part on the validation information.

9. The NVM of claim 8, wherein the metadata includes at least one tag to facilitate identifying a mapping between a logical object written by the DSS to the NVM, and one or more LBA locations on the NVM for storing the logical object.

10. The NVM of claim 1, wherein a namespace creation for the NVM includes encoding in the NVM a schedule for performing the first background task, and wherein the second background task is performed during selected ones of the first background task.

11. The NVM of claim 1, wherein the NVM is one of a cluster of NVM providing distributed storage for the DSS.

12. One or more non-transitory computer-readable media having instructions accessible by a machine including at least one processor, and at least one nonvolatile memory storage (NVM), the machine communicatively coupled to a distributed storage service (DSS) having a scrubber service to validate data stored by the DSS on the nonvolatile memory, that, in response to execution of the instructions by the NVM, cause the NVM to:

first offload the scrubber service through review, as a first background task, within the NVM, NVM operation to identify a first potential error; and second offload the scrubber service through read, as a second background task, a block of data from the NVM having a first portion containing data and a second portion containing validation information for the data, determine a reference validation for the data, and compare the reference validation to the second portion to identify a second potential error, all performed within the NVM;

wherein the first and second potential errors are selectively reported to the scrubber.

13. The one or more computer-readable media of claim 12, wherein the NVM is further caused to:

identify a validation function corresponding to a format of the NVM; and determine the reference validation for the data based at least in part on applying the validation function to the data of the first portion.

14. The one or more computer-readable media of claim 12, wherein the NVM has a physical structure with a format having a logical layout corresponding to the physical structure, and the NVM is further caused to:

first test for failure to successfully read a physical portion of the NVM;

second test for failure to automatically relocate data stored at the physical portion; and on testing failure for both the first and second tests, identify a first portion of the logical layout corresponding to the physical portion; and include the first portion in the first potential error.

15. The one or more computer-readable media of claim 14, wherein the instructions for the second background task comprises instructions to automatically identify a second portion of the logical layout corresponding to the block of data; and include the second portion in the second potential error.

16. The one or more computer-readable media of claim 12, wherein the scrubber is disposed with the DSS and the NVM is a remote target of the DSS, and wherein the NVM is further caused to offload the scrubber service through self-inspection for errors and only report to the scrubber service self-identified errors.

17. The one or more computer-readable media of claim 12, wherein the NVM is disposed within the machine, and the machine comprises:

a controller to receive a write request from the DSS including at least data and metadata associated with the data to store on the NVM; and to control the first and second background tasks based at least in part on the validation information.

18. A system comprising:

a distributed storage service including a scrubber communicatively coupled with a nonvolatile memory to scrub data stored in the non-volatile memory; and the nonvolatile memory, wherein the nonvolatile memory is configured with autonomous self-validation circuitry to offload the scrubber with local scrubbing of the nonvolatile memory to identify errors within the nonvolatile memory; and wherein the scrubber automatically receives reports from the nonvolatile memory of errors detected through the local scrubbing performed by the non-volatile memory to offload the scrubber.

19. The system of claim 18, further comprising:
disposing the distributed storage service and the scrubber in a host; and
disposing the nonvolatile memory and a controller in a disk configured to be a NVMe-oF target communicatively coupled with the host.

20. The system of claim 18, further comprising:
a local PCIe fabric communicatively coupling a selected one of a plurality of distributed storage of the distributed storage service or the scrubber of the distributed storage service with the nonvolatile memory.

* * * * *